US011416235B2

(12) United States Patent
Feigen et al.

(10) Patent No.: US 11,416,235 B2
(45) Date of Patent: *Aug. 16, 2022

(54) SYSTEM AND METHOD FOR MANAGED SERVER INDEPENDENCE FOR DEPLOYMENT OF SOFTWARE APPLICATIONS AND LIBRARIES

(71) Applicant: ORACLE INTERNATIONAL CORPORATION, Redwood Shores, CA (US)

(72) Inventors: Lawrence Feigen, Watchung, NJ (US); Ryan Eberhard, Honesdale, PA (US); Aseem Bajaj, Pleasanton, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/027,748

(22) Filed: Jul. 5, 2018

(65) Prior Publication Data

US 2019/0095189 A1  Mar. 28, 2019

Related U.S. Application Data

(60) Provisional application No. 62/564,753, filed on Sep. 28, 2017.

(51) Int. Cl.
 *G06F 8/65* (2018.01)
 *H04L 67/00* (2022.01)
 *G06F 9/445* (2018.01)

(52) U.S. Cl.
 CPC ............ *G06F 8/65* (2013.01); *G06F 9/44505* (2013.01); *H04L 67/34* (2013.01)

(58) Field of Classification Search
 CPC .................................. G06F 8/65; H04L 67/34
 See application file for complete search history.

(56) References Cited

U.S. PATENT DOCUMENTS 6,167,358 A * 12/2000 Othmer ............... G06F 11/0748
702/188
7,392,522 B2 * 6/2008 Murray ............... G06F 9/44526
717/174

(Continued)

*Primary Examiner* — Lewis A Bullock, Jr.
*Assistant Examiner* — Theodore E Hebert
(74) *Attorney, Agent, or Firm* — Tucker Ellis LLP

(57) ABSTRACT

In accordance with an embodiment, described herein is a system and method for managed server independence for deployment (MSI-D) of software applications and libraries, for use in a cloud computing, application server, or other environment. Software applications or libraries can be prepared for deployment as multi-version format application(s) or library(s). A deployment configuration tool enables use of an input file which specifies one or more deployment configuration overrides data that provide additional pieces of information for each MSI-D/multi-version format application and library. A managed server can independently poll for changes to the deployment configuration overrides, for example to update one or more of its deployed applications or libraries, from a first version to a second version. The system can be used to provide eventual consistency of the deployed application and library versions within a plurality of managed servers.

20 Claims, 11 Drawing Sheets

(56) References Cited

U.S. PATENT DOCUMENTS

| | | | |
|---|---|---|---|
| 7,725,572 B1* | 5/2010 | Kautzleben | H04L 67/025 709/224 |
| 8,024,746 B2 | 9/2011 | Eberhard | |
| 8,117,053 B2 | 2/2012 | Bajaj | |
| 8,464,208 B2 | 6/2013 | Feigen | |
| 8,504,643 B2 | 8/2013 | Feigen | |
| 8,627,286 B2 | 1/2014 | Feigen | |
| 8,707,294 B2 | 4/2014 | Bajaj | |
| 8,863,074 B2 | 10/2014 | Trent | |
| 9,189,304 B2 | 11/2015 | Carr | |
| 9,235,380 B2 | 1/2016 | Trent | |
| 9,767,312 B2 | 9/2017 | Sahoo | |
| 9,785,482 B2 | 10/2017 | Eberhard | |
| 9,792,099 B2 | 10/2017 | Zhang | |
| 9,854,068 B2 | 12/2017 | Carr | |
| 9,906,601 B2 | 2/2018 | Zhang | |
| 9,961,011 B2 | 5/2018 | Mordani | |
| 10,284,486 B2 | 5/2019 | Thyagarajan | |
| 10,318,358 B2 | 6/2019 | Eberhard | |
| 10,356,161 B2 | 7/2019 | Bajaj | |
| 10,673,776 B2 | 6/2020 | Thyagarajan | |
| 10,742,568 B2 | 8/2020 | Mordani | |
| 10,868,721 B2* | 12/2020 | Schneider | G06F 16/958 |
| 2005/0216585 A1* | 9/2005 | Todorova | H04L 41/22 709/224 |
| 2006/0123024 A1* | 6/2006 | Sathyanarayan | H04L 61/1523 |
| 2007/0174776 A1* | 7/2007 | Ghattu | G06F 9/45512 715/733 |
| 2007/0277181 A1 | 11/2007 | Feigen | |
| 2009/0119674 A1 | 5/2009 | Eberhard | |
| 2010/0235433 A1* | 9/2010 | Ansari | H04L 41/12 709/203 |
| 2010/0241485 A1 | 9/2010 | Bajaj | |
| 2010/0257508 A1* | 10/2010 | Bajaj | G06F 9/44563 717/111 |
| 2011/0055809 A1* | 3/2011 | Woods | G06F 9/44505 717/120 |
| 2011/0185340 A1 | 7/2011 | Trent | |
| 2011/0239184 A1 | 9/2011 | Feigen | |
| 2011/0239192 A1 | 9/2011 | Feigen | |
| 2011/0270857 A1* | 11/2011 | Bommireddipalli | G06F 21/62 707/758 |
| 2012/0102109 A1 | 4/2012 | Eberhard | |
| 2013/0055088 A1* | 2/2013 | Liao | G06F 3/0484 715/730 |
| 2013/0066946 A1 | 3/2013 | Carr | |
| 2013/0074093 A1* | 3/2013 | Gounares | G06F 11/3466 718/104 |
| 2013/0081100 A1* | 3/2013 | Sreehari | G06F 21/604 726/1 |
| 2014/0189681 A1* | 7/2014 | Bryan | H04L 63/20 717/176 |
| 2014/0330784 A1* | 11/2014 | Sundaram | G06F 3/0604 707/639 |
| 2014/0365624 A1* | 12/2014 | Whittemore | H04L 67/34 709/221 |
| 2014/0372968 A1 | 12/2014 | Trent | |
| 2015/0120900 A1 | 4/2015 | Sahoo | |
| 2015/0207758 A1 | 7/2015 | Mordani | |
| 2015/0370549 A1* | 12/2015 | Zhang | G06F 8/65 717/172 |
| 2015/0373097 A1* | 12/2015 | Konkus | H04L 67/142 709/203 |
| 2015/0373098 A1 | 12/2015 | Mordani | |
| 2016/0014038 A1 | 1/2016 | Thyagarajan | |
| 2016/0014212 A1 | 1/2016 | Zhang | |
| 2016/0014235 A1 | 1/2016 | Carr | |
| 2016/0085543 A1* | 3/2016 | Islam | G06F 11/1433 717/171 |
| 2016/0094626 A1* | 3/2016 | Bajaj | G06F 9/44521 709/203 |
| 2017/0017494 A1* | 1/2017 | Patel | G06F 9/4401 |
| 2018/0011749 A1 | 1/2018 | Eberhard | |
| 2018/0084040 A1* | 3/2018 | Moreau | H04L 67/1029 |
| 2018/0227242 A1 | 8/2018 | Mordani | |
| 2018/0249309 A1* | 8/2018 | Nakano | H04M 11/00 |
| 2018/0309623 A1* | 10/2018 | Szobi | H04L 41/0869 |
| 2019/0058632 A1* | 2/2019 | Schneider | G06F 16/183 |
| 2019/0095189 A1* | 3/2019 | Feigen | G06F 9/44505 |
| 2019/0215279 A1 | 7/2019 | Thyagarajan | |
| 2020/0004598 A1* | 1/2020 | Brebner | H04L 67/141 |
| 2020/0259761 A1 | 8/2020 | Thyagarajan | |
| 2020/0336437 A1 | 10/2020 | Mordani | |
| 2021/0081190 A1* | 3/2021 | Fagiani | H04L 9/0819 |

* cited by examiner

SYSTEM AND METHOD FOR MANAGED SERVER INDEPENDENCE FOR DEPLOYMENT OF SOFTWARE APPLICATIONS AND LIBRARIES

CLAIM OF PRIORITY

This application claims the benefit of priority to U.S. Provisional Application titled "SYSTEM AND METHOD FOR MANAGED SERVER INDEPENDENCE FOR DEPLOYMENT OF SOFTWARE APPLICATIONS AND LIBRARIES", Application No. 62/564,753, filed Sep. 28, 2017, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing and application server environments, and are particularly related to systems and methods for managed server independence for deployment of software applications and libraries.

BACKGROUND

In some cloud computing or application server environments, an administration server is used to drive operations to deploy software applications or libraries to various managed servers within a domain. For example, when a deployment client issues a command to deploy a particular application or library, the administration server drives the relevant targets through the various phases of deployment.

However, in some environments, managed servers may not always be available to respond to the administration server; or the administration server itself might not be available, which can cause the deployment operation to fail. This can be a particular concern in cloud environments which may include large enterprise applications deployed to thousands of servers. Additionally, in some environments, for example those that include Oracle Fusion Applications or Lifecycle Management, error messages generated during deployment operations may be handled by administrative scripts, rather than human administrators, which might not have been programmed to accommodate some of the situations encountered.

SUMMARY

In accordance with an embodiment, described herein is a system and method for managed server independence for deployment (MSI-D) of software applications and libraries, for use in a cloud computing, application server, or other environment. Software applications or libraries can be prepared for deployment as multi-version format application(s) or library(s). A deployment configuration tool enables use of an input file which specifies one or more deployment configuration overrides data that provide additional pieces of information for each MSI-D/multi-version format application and library. A managed server can independently poll for changes to the deployment configuration overrides, for example to update one or more of its deployed applications or libraries, from a first version to a second version. The system can be used to provide eventual consistency of the deployed application and library versions within a plurality of managed servers.

DETAILED DESCRIPTION

Figure 1:
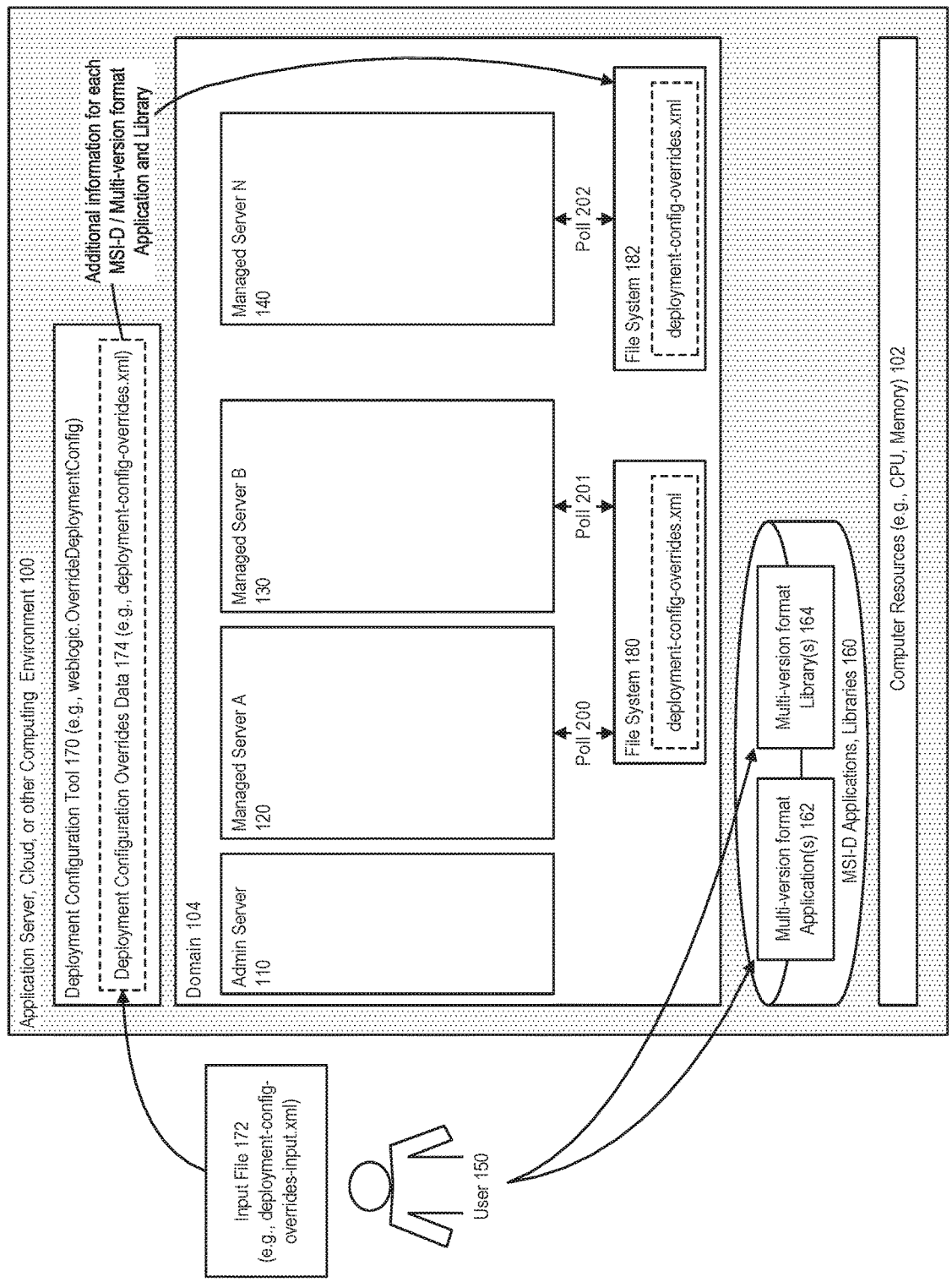
FIG. 1 illustrates a system for managed server independence for deployment of software applications and libraries, in accordance with an embodiment.

As described above, in environments that include a plurality of managed servers to which software applications or libraries are deployed within a domain, including for example cloud environments which may include large enterprise applications deployed to thousands of servers, a concern can be that managed servers may not always be available to respond to an administration server; or the administration server itself might not be available, which can cause deployment operations to fail.

In accordance with an embodiment, described herein is a system and method for managed server independence for deployment (MSI-D) of software applications and libraries, for use in a cloud computing, application server, or other environment. Software applications or libraries can be prepared for deployment as multi-version format application(s) or library(s). A deployment configuration tool enables use of an input file which specifies one or more deployment configuration overrides data that provide additional pieces of information for each MSI-D/multi-version format application and library. A managed server can independently poll for changes to the deployment configuration overrides, for example to update one or more of its deployed applications or libraries, from a first version to a second version. The system can be used to provide eventual consistency of the deployed application and library versions within a plurality of managed servers.

In accordance with an embodiment, using the techniques described herein, the deployment of software applications and libraries to a managed server can be made more independent of an administration server, which in turn enables uptake of new application and library bits, for example during production redeployment; or versioned library deployment and referencing.

Introduction

In some cloud computing or application server environments, an administration server (admin server) is used to drive operations to deploy software applications or libraries to various managed servers within a domain. For example, when a deployment client issues a command to deploy a particular application or library, the administration server drives the relevant targets through the various phases of deployment. However, managed servers may not always be available to respond to the administration server; or the administration server itself might not be available, which can cause the deployment operation to fail. This could be caused, for example, by a lack of disk space, lack of CPU cycles, or network outage.

Additionally, in some environments, for example those that include Oracle Fusion Applications (FA) or Lifecycle Management (LCM), error messages generated during deployment operations may be handled by administrative scripts, rather than human administrators, which might not have been programmed to accommodate some of the situations encountered. For example, an FA/LCM environment may perform two separate production redeployments in order to complete a patching operation, including:

1. Copying the exploded application archive from the original source location to a stand-by location.
2. Performing a production redeployment from "V2.0" (the old version) to "patch" (the new version), where the source location for the new version is the stand-by location.
3. Waiting for the deployment operation and the background retirement to complete.
4. Overwriting the exploded application archive at the original source location with patched files.
5. Performing a production redeployment from "patch" (the old version) to "V2.0" (the new version), where the source location for the new version is the original source location.
6. Waiting for the deployment operation and the background retirement to complete.

The reason for these steps is so that both the version in the domain configuration file (config.xml) and the source location are unchanged when patching completes. To uptake new library bits, an FA/LCM environment may follow a process that includes:

1. Ensuring that applications refer to the library by name alone, not by a specific version with exact-match not specified (or specified as false).
2. Placing the new library version at path different than the path of currently deployed library (so as not to overwrite the currently deployed library).
3. Deploying the new library version using library deploy operation, ensuring that the version is higher than the existing version.
4. Production redeploying the application to uptake new library version.

However, the above process will cause changes to config.xml since the new library version will be added to config.xml. Additionally, FA/LCM environments expect that the original source location remain unchanged as part of hot patching, since many provisioning scripts, tools, and templates expect consistent file system locations; while a cold patching operation can include, for example: shut down all managed servers where the affected application is targeted; overwrite the exploded application archive at the original source location with patched files; start the managed servers that were shut down.

Additionally, many, for example, FA application archives are very large, with some over 1 GB in size, and use a sparse patching model which updates only changed artifacts and does not require replacing complete, for example, Enterprise Application Archive (EAR) contents, allowing the use of "nostage" operations, and shared source locations, and removing the need for managed servers to have to copy files from the admin server to managed-server specific directories.

In accordance with an embodiment, the MSI-D approach can address each of the above topics, including, for example: that FA/LCM scripts are not required to invoke any deployment operation, and can remove the need to use two production redeployments; by not requiring changes to config.xml, or impacting cold patching; and providing a "fail forward" approach so that it the system will not be stuck in an intermediate, inconsistent state.

Managed Server Independence for Deployment (MSI-D)

FIG. 1 illustrates a system for managed server independence for deployment of software applications and libraries, in accordance with an embodiment.

As illustrated in FIG. 1, in accordance with an embodiment, a system providing an application server, cloud, or other computing environment 100 can include one or more computer resources (for example, CPU, memory) 102, and a domain 104 for execution of software applications.

In accordance with an embodiment, the domain can support the use of an administration server (admin server) 110, and a plurality of managed servers, here indicated as managed server A 120, managed server B 130, and managed server N 130.

In accordance with an embodiment, a user 150 can prepare one or more software applications or libraries as MSI-D applications or libraries 160, including one or more multi-version format application(s) 162, and multi-version format library(s) 164, as further described below.

In accordance with an embodiment, a deployment configuration tool 170 (for example, weblogic.OverrideDeploymentConfig), enables use of an input file 172 (for example, deployment-config-overrides-input.xml), which specifies one or more deployment configuration overrides data 174 (for example, deployment-config overrides.xml) that provide additional pieces of information for each MSI-D/multi-version format application and library.

In accordance with an embodiment, each managed server can access a file system, for example one of file systems 180, 182, each of which can be either associated with a particular managed server, or associated and shared between a plurality of managed servers, and which provide access to the deployment configuration overrides data (for example, deployment-config overrides.xml).

As further described below, the managed servers can independently poll 200, 201, 202 their associated file system, to determine updates to the deployment configuration overrides data (for example, deployment-config overrides.xml) stored therein.

Figure 2:
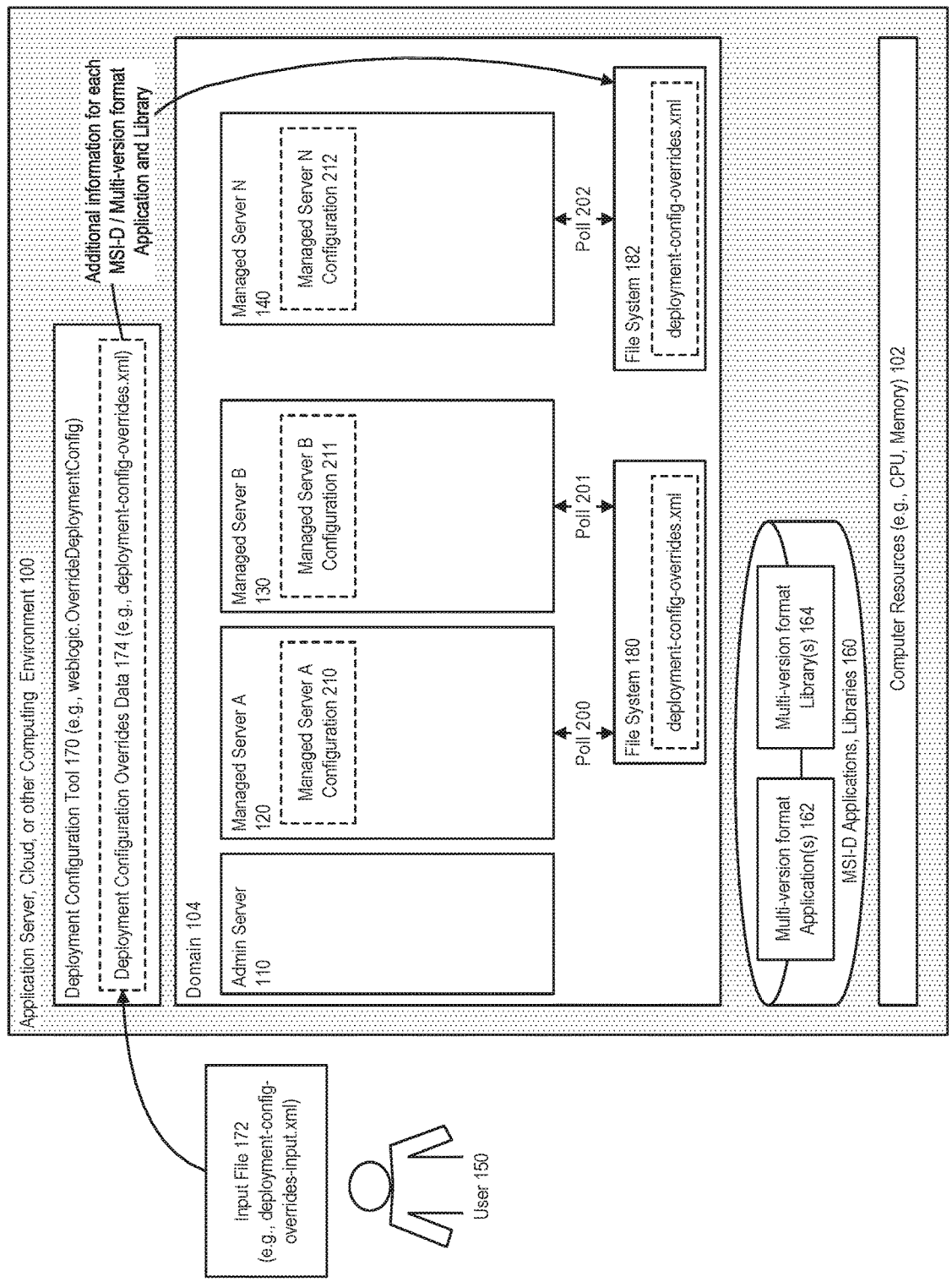
FIG. 2 further illustrates a system for managed server independence for deployment of software applications and libraries, in accordance with an embodiment.

FIG. 2 further illustrates a system for managed server independence for deployment of software applications and libraries, in accordance with an embodiment.

As illustrated in FIG. 2, in accordance with an embodiment, each of the plurality of managed servers can be associated with a managed server configuration, here indicated as managed server A configuration 210, managed server B configuration 211, and managed server N configuration 212.

Figure 3:
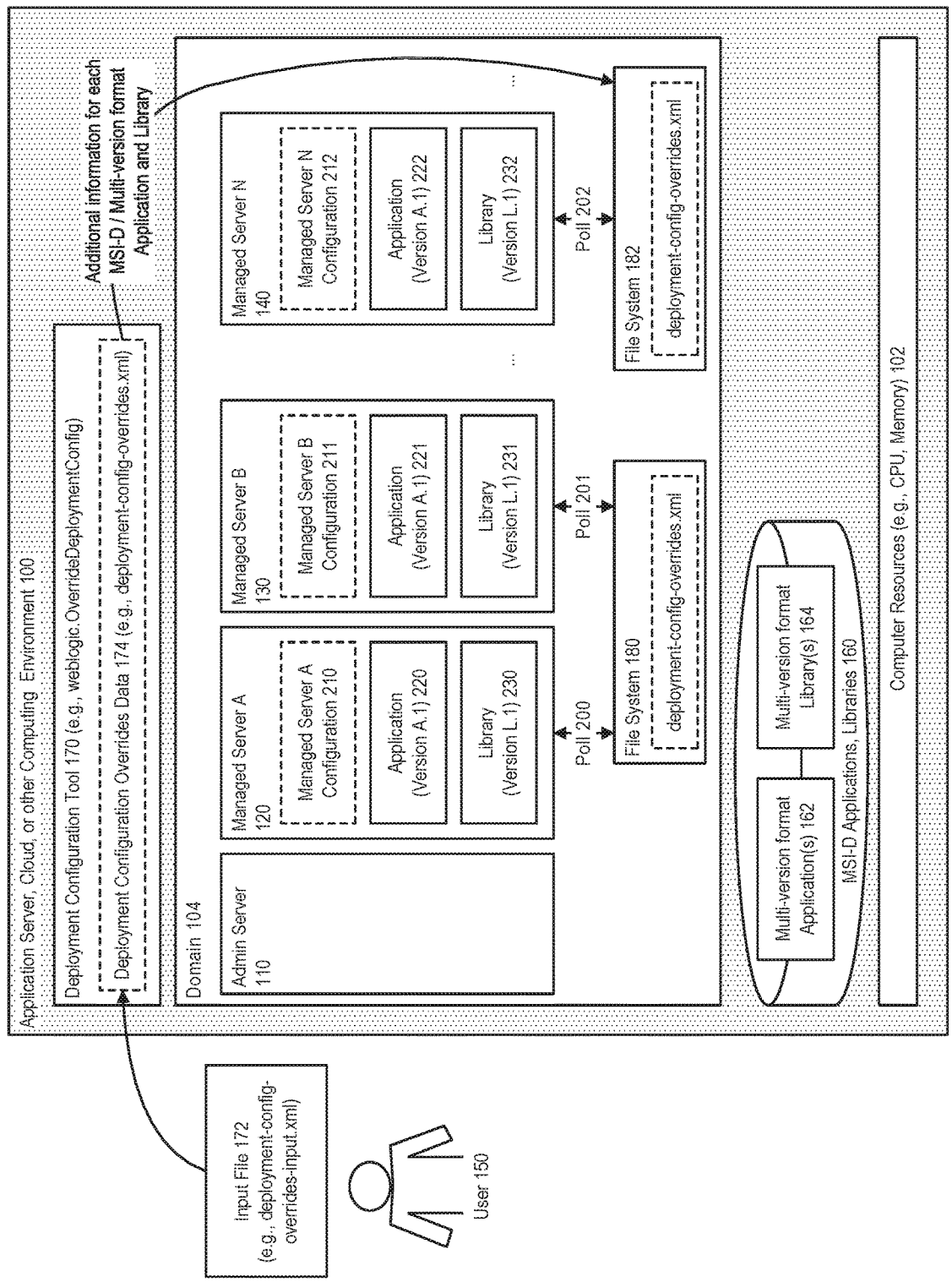
FIG. 3 further illustrates a system for managed server independence for deployment of software applications and libraries, in accordance with an embodiment.

FIG. 3 further illustrates a system for managed server independence for deployment of software applications and libraries, in accordance with an embodiment.

As illustrated in FIG. 3, in accordance with an embodiment, one or more multi-version format application(s), for example Application (Version A.1), here indicated as 220, 221, 222, and/or multi-version format library(s), for example Library (Version L.1), here indicated as 230, 231, 232, can be deployed to the managed servers, as further described below.

Figure 4:
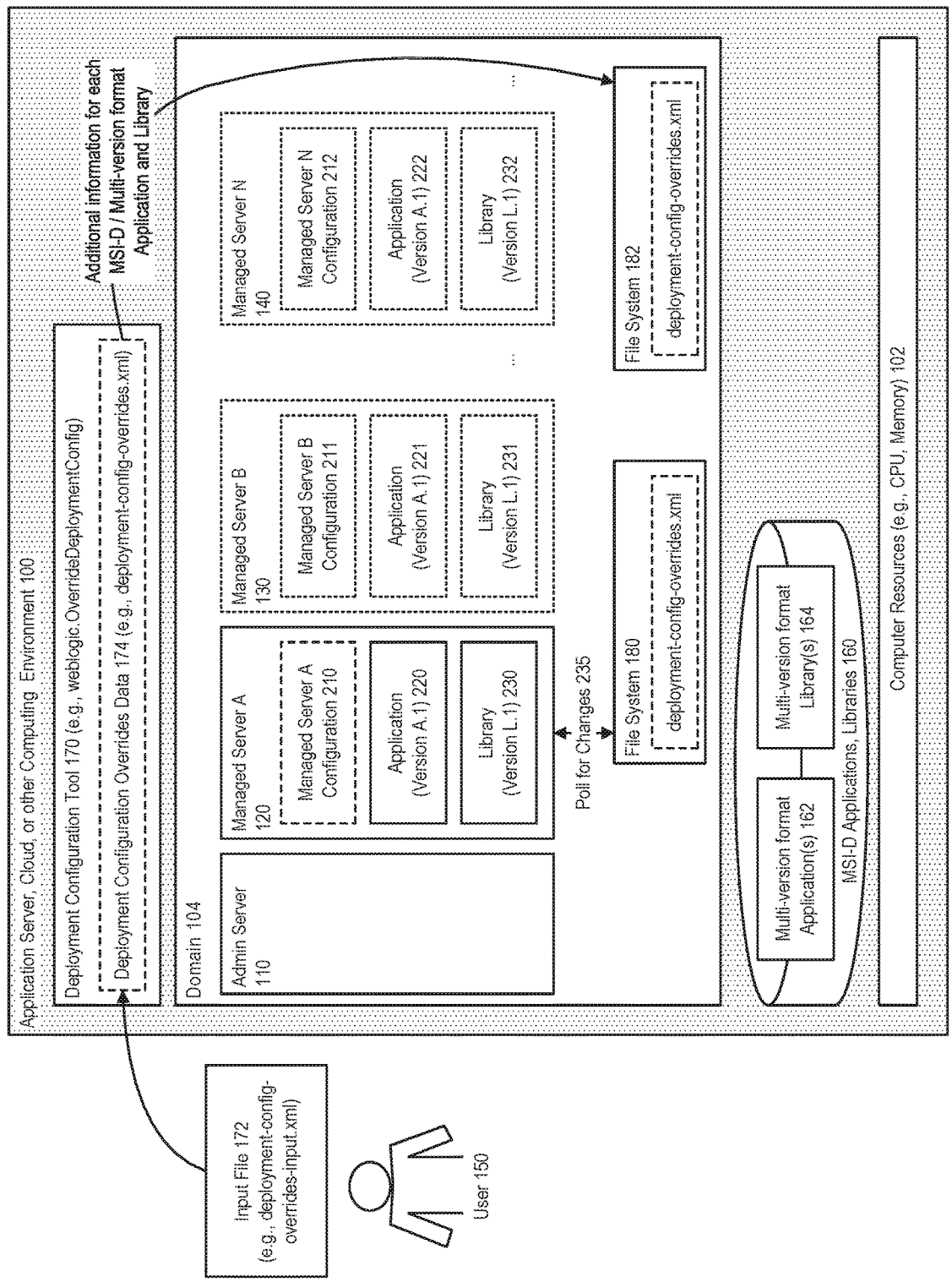
FIG. 4 further illustrates a system for managed server independence for deployment of software applications and libraries, in accordance with an embodiment.

FIG. 4 further illustrates a system for managed server independence for deployment of software applications and libraries, in accordance with an embodiment.

As illustrated in FIG. 4, in accordance with an embodiment, at a particular point in time associated with a polling interval, one or more of the managed servers, for example managed server A, can independently poll for changes 235 to the deployment configuration overrides data (for example, a new deployment-config overrides.xml).

Figure 5:
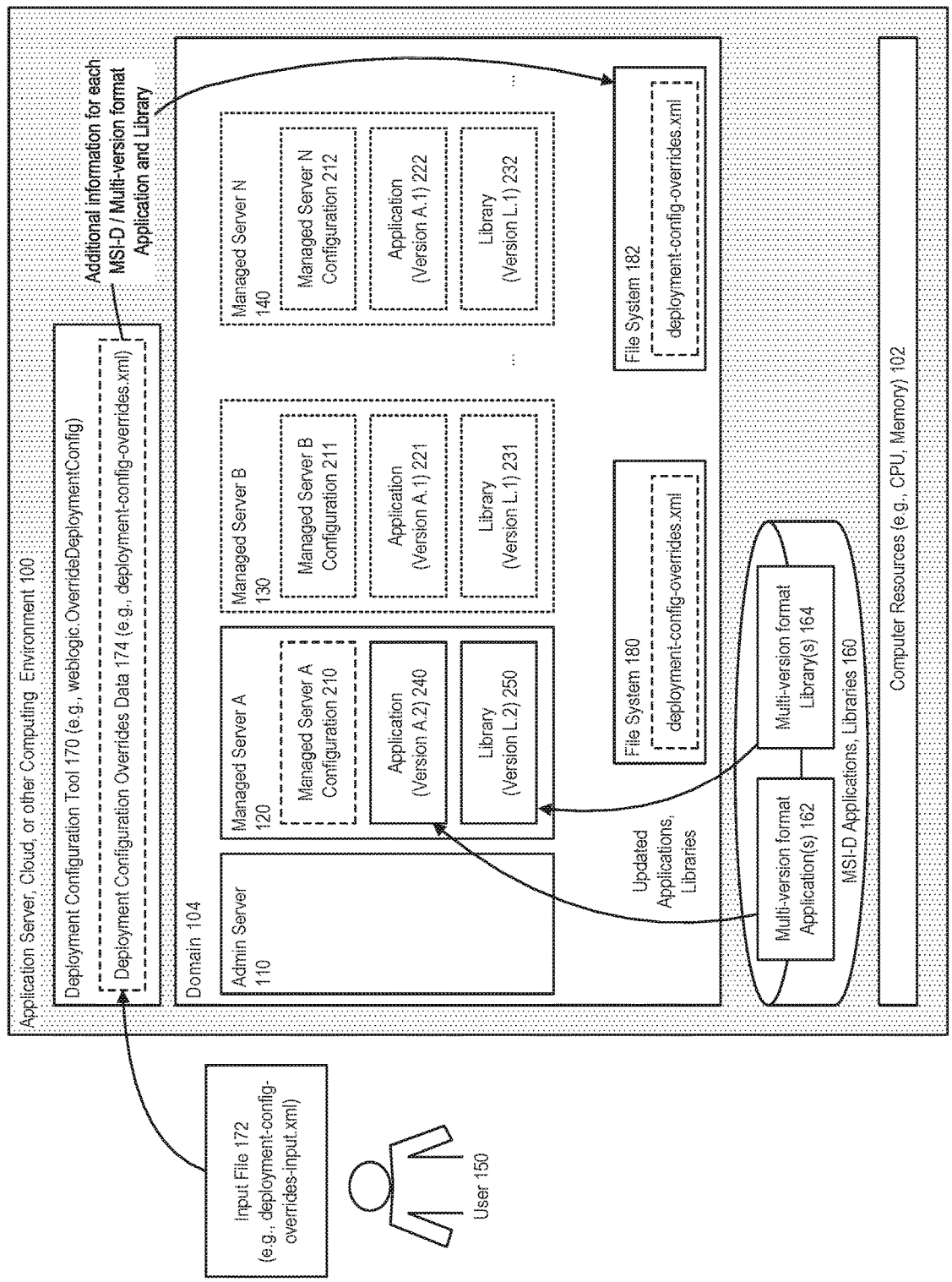
FIG. 5 further illustrates a system for managed server independence for deployment of software applications and libraries, in accordance with an embodiment.

FIG. 5 further illustrates a system for managed server independence for deployment of software applications and libraries, in accordance with an embodiment.

As illustrated in FIG. 5, in accordance with an embodiment, in response to the managed server A's polling indicating changes to the deployment configuration overrides data, the managed server can independently perform corresponding changes to its configuration, for example to update one or more of its deployed applications or libraries, for example from Application (Version A.1) to (Version A.2), here indicated as 240, and/or from Library (Version L.1) to (Version L.2), here indicated as 250.

Figure 6:
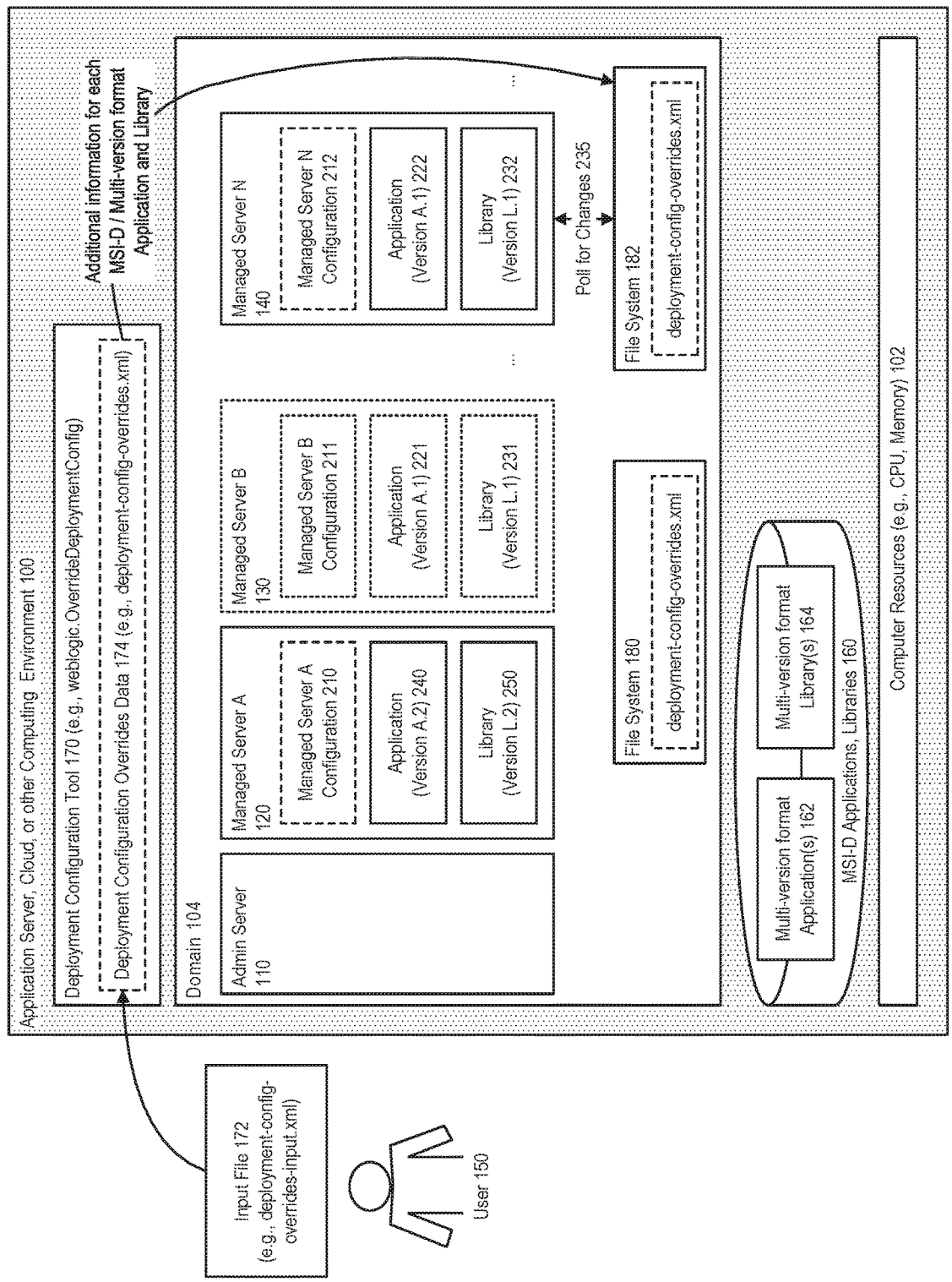
FIG. 6 further illustrates a system for managed server independence for deployment of software applications and libraries, in accordance with an embodiment.

FIG. 6 further illustrates a system for managed server independence for deployment of software applications and libraries, in accordance with an embodiment.

As illustrated in FIG. 6, in accordance with an embodiment, at a particular point in time associated with a polling interval, another of the managed servers, for example managed server N, can similarly independently poll for changes to the deployment configuration overrides data (for example, a new deployment-config overrides.xml).

Figure 7:
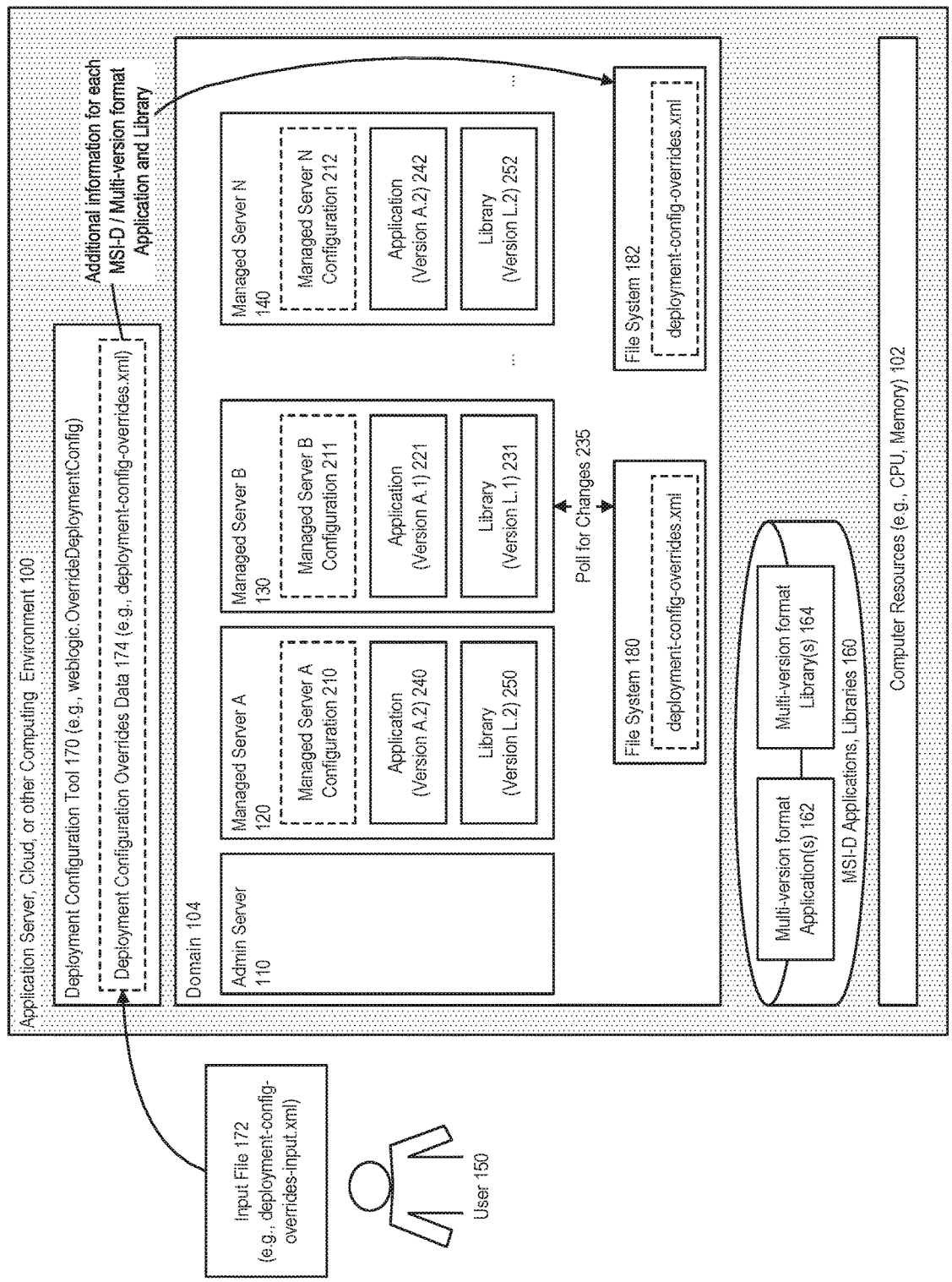
FIG. 7 further illustrates a system for managed server independence for deployment of software applications and libraries, in accordance with an embodiment.

FIG. 7 further illustrates a system for managed server independence for deployment of software applications and libraries, in accordance with an embodiment.

As illustrated in FIG. 7, in accordance with an embodiment, in response to the managed server N's polling indicating changes to the deployment configuration overrides data, the managed server can similarly independently perform corresponding changes to its configuration, for example to update one or more of its deployed applications or libraries from Application (Version A.1) to (Version A.2) 242, and/or from Library (Version L.1) to (Version L.2) 252.

In accordance with an embodiment, at the same time, and associated with its polling interval, another of the managed servers, for example managed server B, can similarly independently poll for changes to the deployment configuration overrides data (for example, a new deployment-config overrides.xml).

Figure 8:
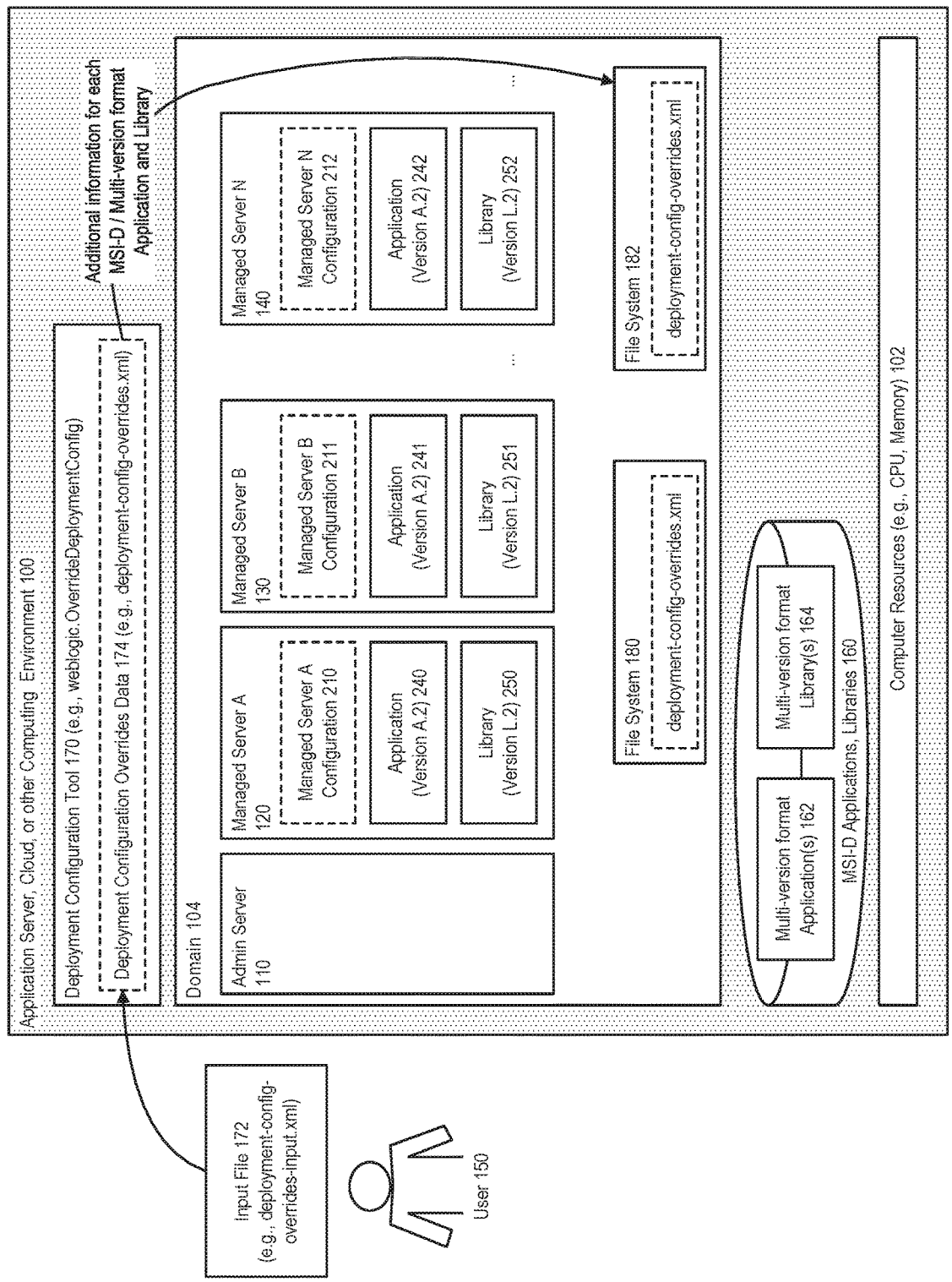
FIG. 8 further illustrates a system for managed server independence for deployment of software applications and libraries, in accordance with an embodiment.

FIG. 8 further illustrates a system for managed server independence for deployment of software applications and libraries, in accordance with an embodiment.

As illustrated in FIG. 8, in accordance with an embodiment, in response to the managed server B's polling indicating changes to the deployment configuration overrides data, the managed server can similarly independently perform corresponding changes to its configuration, for example to update one or more of its deployed applications or libraries from Application (Version A.1) to (Version A.2) 241, and/or from Library (Version L.1) to (Version L.2) 251.

As illustrated in FIG. 8, in accordance with an embodiment, as a result of their independent polling and updating of deployed applications and/or libraries, the plurality of managed servers can eventually become consistent with one another with regard to the versions of applications and libraries deployed to those managed servers.

Additionally, in accordance with an embodiment, the use of deployment configuration overrides (for example, deployment-config overrides.xml) as described above, helps to address situations such as, for example, when using shared file systems, for a particular server to see an update to a first Application 1, but not see an update to a second Application 2, or to a needed library. By acting as a pointer to those elements a managed server is supposed to be using, the use of deployment configuration overrides provides a means of making the operation atomic; and also enables linking of a change to one particular element (for example, an application) with a change to another element (for example, a library).

Figure 9:
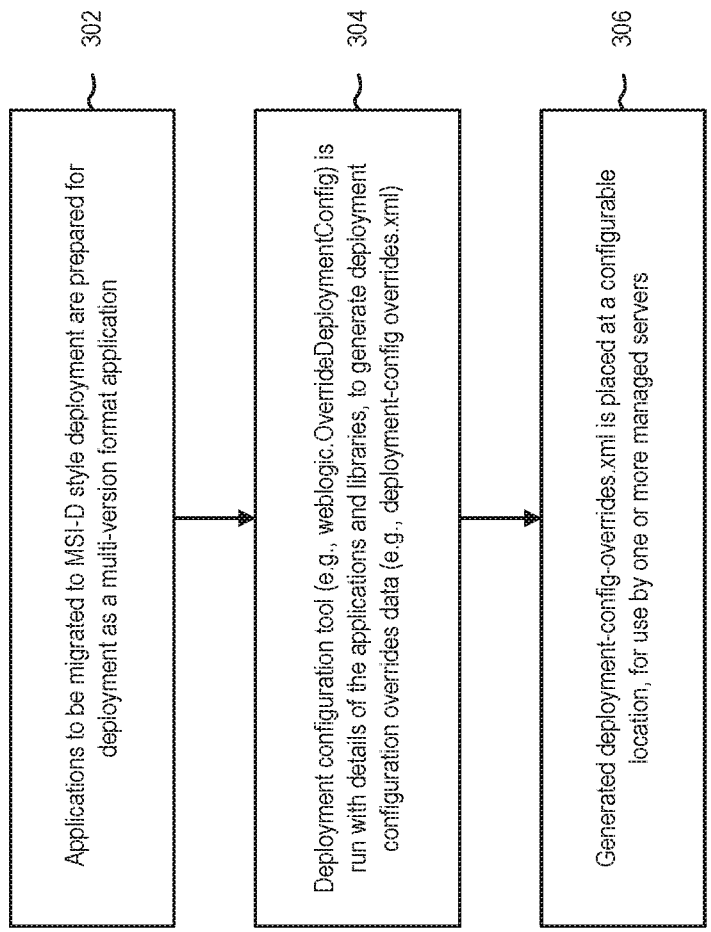
FIG. 9 illustrates a process for deploying software applications and libraries, which accommodates managed server independence, in accordance with an embodiment.

FIG. 9 illustrates a process for deploying software applications and libraries, which accommodates managed server independence, in accordance with an embodiment.

As illustrated in FIG. 9, in accordance with an embodiment, at step 302, applications to be migrated to MSI-D style deployment are prepared for deployment as a multi-version format application At step 304, a deployment configuration tool (for example, weblogic.OverrideDeploymentConfig) is run with details of the applications and libraries, to generate deployment configuration overrides data (for example, deployment-config overrides.xml).

At step 306, a generated deployment-config-overrides.xml is placed at a configurable location, for use by one or more managed servers.

Figure 10:
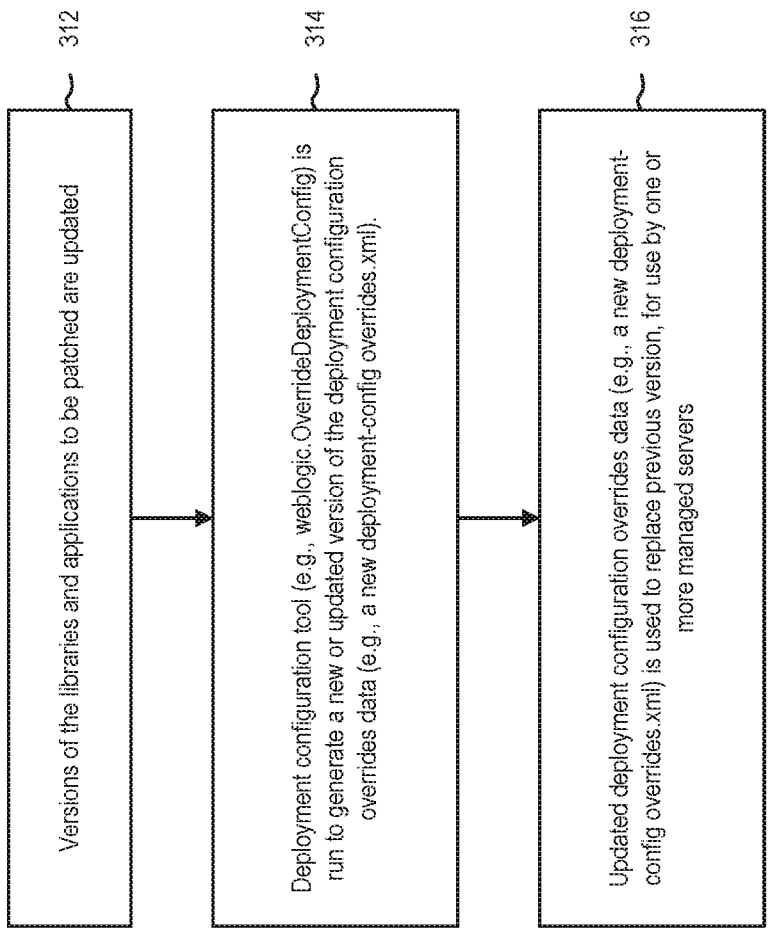
FIG. 10 illustrates a process for patching or otherwise updating software applications and libraries, which accommodates managed server independence, in accordance with an embodiment.

FIG. 10 illustrates a process for patching or otherwise updating software applications and libraries, which accommodates managed server independence, in accordance with an embodiment.

As illustrated in FIG. 10, in accordance with an embodiment, at step 312, versions of the libraries and applications to be patched are updated.

At step 314, a deployment configuration tool (for example, weblogic.OverrideDeploymentConfig) is run to generate a new or updated version of the deployment configuration overrides data (for example, a new deployment-config overrides.xml).

At step 316, the updated deployment configuration overrides data (for example, a new deployment-config overrides.xml) is used to replace the previous version, for use by one or more managed servers Example Implementation In accordance with an embodiment, an example implementation is described herein for purposes of illustration of the above-described systems and methods. In accordance with various embodiments, different and/or additional features can be provided.

In accordance with an embodiment, to setup MSI-D applications and libraries, the process can include:

1. For all applications that need to be migrated to MSI-D, moving them to multi-version format.
2. Running weblogic.OverrideDeploymentConfig with details of the applications and libraries to generate deployment-config-overrides.xml.
3. Placing the generated deployment-config-overrides.xml at a configurable location.

In accordance with an embodiment, to patch MSI-D deployments, the process can include:

1. Updating new versions of libraries and applications that need to be patched.
2. Running weblogic.OverrideDeploymentConfig with along with previous copy of deployment-config-overrides.xml to generate a new deployment-config-overrides.xml.
3. Placing the updated deployment-config-overrides.xml to replace old copy of deployment-config-overrides.xml.

versions 007.1 and 7.1 are treated as the same version; and versions 7.002 and 7.2 are also treated as the same version. A comparison is performed by identifying individual component decimal numbers separated by dot. Moving from left to right, the component decimal numbers are compared, moving right if the particular component decimal numbers are equal. The larger decimal component makes the dot-decimal string higher. In a comparison of existent and non-existent decimal component, the one with existent decimal component is valued higher.

Command Line Tool (weblogic.OverrideDeploymentConfig)

In accordance with an embodiment, the weblogic.OverrideDeploymentConfig can be provided as a command line or other tool that can be used to generate deployment-config-overrides.xml from a deployment-config-overrides-input.xml file, for example as illustrated below and in Table 1:

```
java weblogic.OverrideDeploymentConfig -output /tmp/ -tokens
$ORACLE_HOME$=/u01/ /u01/domains/retail/config/deployment-
config-overrides-input.xml
```

TABLE 1

| Type | Name | Required | Description |
|---|---|---|---|
| Argument | — | Yes | The path to deployment-config-overrides-input.xml file. |
| Option | -output | Yes | The path to a directory where generated file will be written. The path cannot point to a directory where a deployment-config-overrides.xml already exists. |
| Option | -tokens | No | Comma-separate name-value pairs in the "name=value" format. Any instance of "name" in the deployment-config-overrides.xml will be replaced by the corresponding "value". |
| Argument | — | Yes | The path to deployment-config-overrides.xml file generated earlier. |
| Option | -print | Yes | A flag that makes the tool print out the application IDs from deployment-config-overrides.xml in a tabular format <Configured Application Id> <Inferred Application Id> <Inferred version>. |

Application and Library Format and Staging

In accordance with an embodiment, applications and libraries can be deployed with a "nostage" staging mode. In this staging mode it is expected that the source is accessible on shared disk space to each managed server. The application or library can be deployed as a "multi-version" or similar directory format. The contents of the directory can be directories with name in, for example, dot-decimal notation that represents the version of the application or library. In this example, the highest valid version will represent the latest version of the application or library. By keeping the old application version bits separate, the managed server can fully service it until that version retires.

```
/u01/applications/landscapedesign/
    -> /u01/applications/landscapedesign/4.15/
    -> /u01/applications/landscapedesign/4.16/
/u01/libraries/soilmanagement/
    -> /u01/libraries/soilmanagement/5/
    -> /u01/libraries/soilmanagement/5.1/
```

Version (Dot-Decimal) Notation

In accordance with an embodiment, a version string representation, for example 1, 1.1, 1.1.2, 1.4.2.1, can be used. In this example, trailing zeros can be ignored, such that versions 1.0.0, 1.0, and 1 are treated as the same version. Leading zeros within a version can also be ignored, such that Configuration Overrides Input File (deployment-config-overrides-input.xml)

In accordance with an embodiment, the input file can refer to paths that are of multi-version format.

```
<deployment-config-overrides-input>
    <app-deployment>
        <name>landscapedesign#V2.0</name>
        <!-- Refers to exact same name as in app-deployment element of
config.xml -->
        <source-path>$ORACLE_HOME$/applications/landscapedesign/
</source-path>
        <!-- Refers to application source in multi-version format -->
        <retire-timeout>180</retire-timeout>
        <!-- Optional timeout for retirement of older version of this
application -->
    </app-deployment>
    <library>
        <name>soilmanagement</name>
        <!-- Refers to the exact same name as in library element of
config.xml -->
        <source-path>$ORACLE_HOME$/libraries/soilmanagement/
</source-path>
        <!-- Refers to library source in multi-version format -->
    </library>
</deployment-config-overrides-input>
```

In accordance with an embodiment, to update deployment-config-overrides.xml, weblogic.OverrideDeploymentConfig can be run again using the same deployment-config-overrides-input.xml. All the currently listed applications and libraries will be scanned for updated versions. Even when application bits not have changed, its version might get updated if a referring library has been revised.

Configuration Overrides XML (deployment-config-overrides.xml)

In accordance with an embodiment, the deployment-config-overrides.xml file can represent locations for all MSI-D applications and libraries. These applications and libraries must still be configured in config.xml. The deployment-config-overrides.xml will provide two additional pieces of information for each MSI-D library and three additional pieces of information of each MSI-D application:

1. Source Path (Required): The location to new bits for application or library. The source path refers to the actual version sub-directory that will be used.

2. Generated Version (Required): For libraries, this can be in dot-decimal format. The value can be the same as the highest dot-decimal sub-directory name. For applications, this can be a string that will work, for example in the manner of a checksum, and will change when there is a change in source-path of the application or any of the referred libraries.

3. Retire Timeout (Optional): For applications, this can be the timeout in seconds after which previous deployment of the application will be retired. The default value can be 300 seconds. Setting this value to 0 starts will start immediate retirement.

In accordance with an embodiment, an example deployment-config-overrides.xml file can be indicated as:

```
<deployment-config-overrides>
    <app-deployment>
<name>landscapedesign#V2.0</name>
<!-- Copied over from deployment-config-overrides-input.xml -->
        <source-path>/u01/applications/landscapedesign/4.15</source-path>
<!-- Computed from deployment-config-overrides-input.xml by replacing tokens and adding sub-directory at the end -->
        <retire-timeout>180</retire-timeout>
<!-- Copied over from deployment-config-overrides-input.xml -->
        <generated-version>K54vl8rgR5Hw</generated-version>
<!-- Generated using application source and all referred library sources -->
    </app-deployment>
    <library>
        <name>soilmanagement</name>
<!-- Copied over from deployment-config-overrides-input.xml -->
<source-path>/u01/libraries/soilmanagement/5</source-path>
<!-- Computed from deployment-config-overrides-input.xml by replacing tokens and adding sub-directory at the end -->
        <generated-version>5</generated-version>
<!-- Generated using the latest version sub-directory name -->
    </library>
</deployment-config-overrides>
```

Placement of deployment-config-overrides.xml

In accordance with an embodiment, the default location of deployment-config-overrides.xml can be the config directory of the domain; and this location can be configurable in config.xml itself using an optional element, for example:

```
<domain>
...
    <deployment-configuration>
        <deployment-config-overrides>
<!-- Directory where deployment-config-overrides.xml should be looked for.Default value "config/" -->
<dir>/u01/patches/1dgrg6/</dir>
<!-- Polling interval for deployment-config-overrides.xml in seconds. Default value 300 -->
<poll-interval>3600</poll-interval> <
</deployment-config-overrides>
```

```
<!-- Default retire timeout for MSI-D applications if not specified in deployment-config-overrides.xml. Value in seconds. Default value 300 -->
<default-multi-version-app-retire-timeout>60</default-multi-version-app-retire-timeout>
    </deployment-configuration>
...
</domain>
```

Inferred Version

In accordance with an embodiment, the inferred version identifier (version ID) of an application or library can be computed using, for example:

1. Configured Version: A version string in <name> element of <app-deployment> or <library> in config.xml.

2. Generated Version: A generated version value from deployment-config-overrides.xml, for example:

Inferred Version=[<Config Version>.]<Generated Version>

For example, in accordance with an embodiment, if the <name> element in config.xml reads as "landscapedesign#V2.0"; the version string from config.xml can be read as "V2.0". As another example, if the generated version is "K54vl8rgR5Hw"; the inferred application version will be "V2.0.K54vl8rgR5Hw". The inferred application identifier (application ID) can be computed from the inferred version ID. In the example above, the inferred application ID will be "landscapedesign#V2.0.K54vl8rgR5Hw". A FA/LCM script can use the application ID to look up and operate upon, for example, an ApplicationRuntimeMBean.

Domain Configuration (config.xml)

In accordance with an embodiment, the appropriate application and libraries can be identified in deployment-config-overrides.xml file, for example:

```
<app-deployment>
    <name>landscapedesign#V2.0</name>
    <module-type>ear</module-type>
    <source-path>/u01/applications/landscapedesign</source-path>
    <security-dd-model>CustomRolesAndPolicies</security-dd-model>
    <staging-mode>nostage</staging-mode>
    <plan-staging-mode xsi:nil="true"></plan-staging-mode>
    <cache-in-app-directory>false</cache-in-app-directory>
</app-deployment>
<library>
    <name>soilmanagement</name>
    <source-path>/u01/libraries/soilmanagement</source-path>
    <staging-mode>nostage</staging-mode>
</app-deployment>
```

In accordance with an embodiment, hot patching with the MSI-D approach will not cause any changes to config.xml either; and there is no need for communication of updated config.xml from the admin server to various managed servers.

AppDeploymentMBean and LibraryMBean Clones

Figure 11:
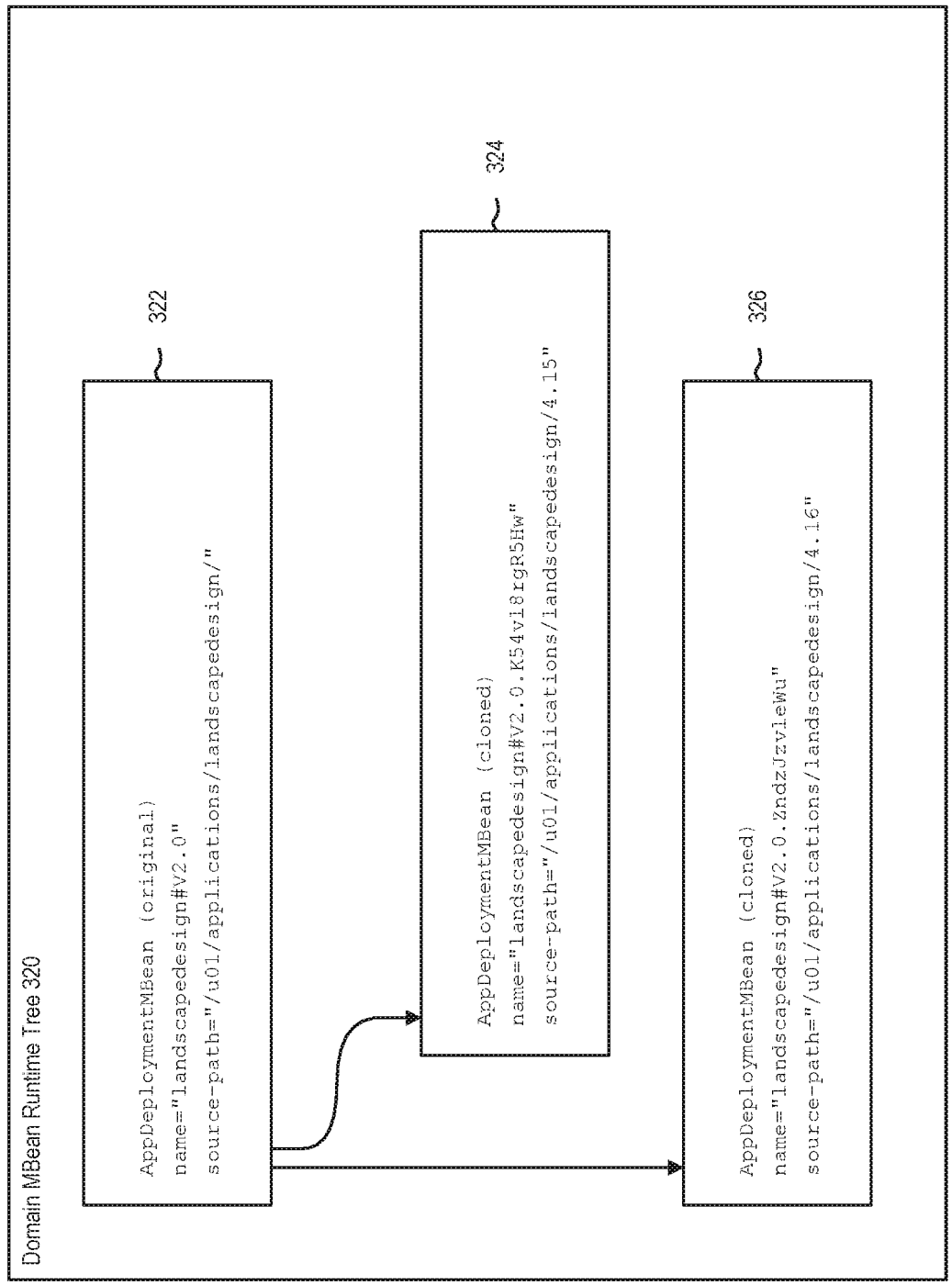
FIG. 11 illustrates the use of managed software objects, for example managed bean (MBean) clones, for managed server independence, in accordance with an embodiment.

FIG. 11 illustrates the use of managed software objects, for example managed bean (MBean) clones, for managed server independence, in accordance with an embodiment.

As illustrated in FIG. 11, in accordance with an embodiment, each <app-deployment> or <library> in config.xml corresponds to an AppDeploymentMBean or LibraryMBean in-memory in DomainMBean edit tree 320. The DomainMBean edit tree can be copied over into DomainMBean runtime tree. The DomainMBean runtime tree is used by various server components to process deployments.

In accordance with an embodiment, for MSI-D style app-deployment or library elements, a cloned version 324 of AppDeploymentMBean or LibraryMBean can be created in DomainMBean runtime tree for each version. This clone can be created from the original MBean 322 that represents the actual element in config.xml. The cloned MBean will have modified <name> and <source-path> to reflect the correct application ID and source path respectively.

For example, in accordance with an embodiment, an MSI-D application "landscapedesign#V2.0" deployed with a source-path/u01/applications/landscapedesign/4.15 and a generated version of "4.15", will cause creation of a clone with name landscapedesign#V2.0.4.15 and source-path to point to /u01/applications/landscapedesign/4.15. Similarly, a generated version of "4.16" with a source path of /u01/patches/1dgrg6/landscapedesign will cause creation of a clone 326 with the name "landscapedesign#V2.0.4.16" and source-path to point to /u01/applications/landscapedesign/4.16.

Migration to MSI-D Style Deployments

In accordance with an embodiment, for any given application or library, migration to MSI-D will only be allowed in a cold reboot cycle.

File System Notification and Polling

In accordance with an embodiment, since some file system protocols (for example, NFS v3) may not support notifications of file system changes, the system can utilize polling of a file system to check for changes to the file system.

Exact Matching

In accordance with an embodiment, users can make references to shared libraries using deployment descriptors:

```
<library-ref>
    <library-name>soilmanagement</library-name>
</library-ref>
```

In accordance with an embodiment, such references may also be made by providing a minimum specification version, for example:

```
<library-ref>
    <library-name>soilmanagement</library-name>
    <specification-version>5</specification-version>
</library-ref>
```

In accordance with an embodiment, it is also possible to make shared library references by specifying a minimum specification version and a minimum implementation version, for example:

```
<library-ref>
    <library-name>soilmanagement</library-name>
    <specification-version>5</specification-version>
    <implementation-version>1.1</implementation-version>
</library-ref>
```

In accordance with an embodiment, the specification-version and implementation-version specify the minimum version that must be found and matched. The library-ref configuration also supports an optional "exact-match" element where the exact specification version and/or implementation version must be found and matched.

Patching Applications and Libraries

In accordance with an embodiment, when FA/LCM scripts have to patch applications or libraries, they can run the weblogic.OverrideDeploymentConfig tool to obtain a new deployment-config-overrides.xml and then replace the current deployment-config-overrides.xml, for example as illustrated in Table 2.

TABLE 2

| Scenario | Steps | Details |
| --- | --- | --- |
| Patch one or more applications | Update the application and libraries in multi-version format to add new versions. Run weblogic.OverrideDeploymentConfig by providing the current deployment-config-overrides.xml to get a new deployment-config-overrides.xml. Replace existing deployment-config-overrides.xml with the newly updated one. | The applications with new source paths will automatically get new generated versions. Replacing deployment-config-overrides.xml with a new one will make all managed servers detect new versions of existing applications. A production redeployment-like process will patch the relevant applications to new respective versions. |
| Patch one or more libraries | As above. | The libraries with new source paths will automatically get new generated versions. The applications that refer to such libraries will automatically get new generated versions too. Replacing deployment-config-overrides.xml with a new one will make all managed servers detect new versions of libraries and applications. A deployment-like process will introduce new library versions to each of the managed servers. A production redeployment-like process will roll over the relevant applications to a new instances of themselves, referring to newer bits of updated libraries. |

TABLE 2-continued

| Scenario | Steps | Details |
| --- | --- | --- |
| Patch one or more libraries and applications | As above. | The libraries with new source paths will automatically get new generated versions. The applications with new source paths will automatically get a new generated versions. The applications that have not been updated, but refer to updated libraries will automatically get new generated versions too. Replacing deployment-config-overrides.xml with a new one will make all managed servers detect new versions of libraries and applications. A deployment-like process will introduce new library versions to each of the managed servers. A production redeployment-like process will patch the relevant applications to new respective versions of updated applications. A production redeployment-like process will roll over the relevant applications to a new instances of themselves, referring to newer bits of updated libraries. |

Self-Driven Retirement

In accordance with an embodiment, each managed server can direct retirement of the old version of the application on its own. This can reduce the risk of delays and complications in retirement caused by network disconnections or crashed managed servers. Production redeployment supports a command line option "retirementtimeout". This is the time after completion of deployment of the new version that retirement commences irrespective of whether or not all sessions have expired from the old version. This configuration can now be configured in deployment-config-overrides.xml.

Application State and Administration Server

In accordance with an embodiment, the admin server computes the state of an application by aggregating the state of application for each managed server. The state of application on each managed server is recorded on the admin server. This recording is used for computation of aggregates. With MSI-D, since managed servers can direct deployment on their own, and may not be relaying any state to the admin server, when the admin server is contacted to check the state of an application, it can in turn contact the managed servers and use the returned values for aggregation.

In accordance with an embodiment, since the managed server automatically pick up new bits, there may be no deployment operation or task. Traditionally FA/LCM script has checked the completion status of deployment task. To address this, the way to check uptake of a new version can include looking for the state of the new version of the application. The way to know if the older version has retired can include checking the state of the older version of the application.

Conventional Deployment Operations

In accordance with an embodiment, conventional deployments can be migrated to MSI-D style deployments as described above. After migration, some conventional operations may not be supported for MSI-D applications, for example, redeploy and undeploy.

Relative Paths in Manifest Classpath

In accordance with an embodiment, for MSI-D style applications, the source path for an application or a library will change when a new version is picked up by the server. Therefore, the relative paths used in manifest class path of jar files might not work. These referred jars can be deployed as libraries and referred to using shared library references in applications.

Initial Deployment from Domain Template

In accordance with an embodiment, the sequence of events to perform an initial deployment from a domain template can include:

1. Domain template will inscribe the application deployed as a directory to a cluster with "nostage" stage mode in config.xml. Say the source is /u01/applications/landscape-design.

2. The config/deployment-config-overrides.xml will have an entry for this application.

3. When a managed server of target cluster will boot up for the first time, it will find an app deployment in config.xml, it will look for the same app deployment in deployment-config-overrides.xml. It will use the source-path from deployment-config-overrides.xml. It will then clone the AppDeploymentMBean and will set the inferred application ID using the generated version. Say the generated version is "4.15". So the inferred application ID in this cloned MBean will be landscapedesign#V2.0.4.15.

4. Managed server will use the cloned MBean for deployment.

MSI-D Application Patching on Running Managed Servers

In accordance with an embodiment, the sequence of events to perform MSI-D application patching on running managed servers can include:

1. When the user has a new version of an application, they will add a new version subdirectory to the application source. Then they will run weblogic.OverrideDeploymentConfig to generate deployment-config-overrides.xml with the new source path.

2. The user will update config/deployment-config-overrides.xml.

3. Each managed server will get notified of a new valid application version and will initiate deployment of the new version of the application.

4. Each managed server will create a new clone for the new version.

5. Each managed server will leverage the production redeployment code path to deploy the new version.

6. Each managed server will retire the old version without any help from the admin server.

7. Among other things, retirement will cause removal of the respective cloned AppDeploymentMBean as well.

8. The old source-path of the application may be removed by the user after retirement.

9. When a user queries the state of the old version of the application, the admin server will connect to each of the managed servers to get state, then will aggregates and return the value.

MSI-D Application Patching on Shutting Down or Crashing Managed Servers

In accordance with an embodiment, the sequence of events to perform MSI-D application patching on shutting down or crashing managed servers can include:

1. When the user has a new version of an application, they will add a new version subdirectory to the application source. Then they will run weblogic.OverrideDeploymentConfig to generate deployment-config-overrides.xml with the new source path.

2. While user is copying an updated deployment-config-overrides.xml to config/

2.1. A managed server crashes or is shut down before copy completion: It will subsequently be started up by administrator or administrative scripts:

2.1.1. New config/deployment-config-overrides.xml has not been copied over: The server will find source paths from last copy of config/deployment-config-overrides.xml and will use them for deployments.

2.1.2. New config/deployment-config-overrides.xml has been copied over: The server will consider the new copy, get the new source paths and use it for deployments.

2.2. New config/deployment-config-overrides.xml has been copied over, managed server starts uptake of new copy but crashes or is shut down before completion. When the server starts up again, it will find this new copy again. It will deploy using source paths declared in this copy of config/deployment-config-overrides.xml.

MSI-D Library Patching

In accordance with an embodiment, the sequence of events to perform MSI-D library patching can include:

1. When the user has a new version of a library, they will add a new version subdirectory to the library source. Then they will run weblogic.OverrideDeploymentConfig with the new source-path.

2. The user will update config/deployment-config-overrides.xml.

3. Each managed server will get notified of a new valid library version and will initiate deployment of the new version of the library.

4. Each managed server will create the new clone for the new library version.

5. Each managed server will register the new version of the library to the registry.

6. Each managed server will get notified of new valid application versions (that would have been updated since they referred to the patched library). Each of these servers will initiate deployment of the new version of the application.

7. Each managed server will leverage the production redeployment code path to deploy the new version. The new version of the application will refer to the new version of the library.

8. Each managed server will retire the old version on its own without any help from the admin server.

9. Among other things, retirement will cause removal of the respective cloned AppDeploymentMBean.

10. When a user queries the state of the older version of the application, the admin server will connect to each of the managed servers to get state, then will aggregate and return the value.

Inferred Application Version and Real Source-Path

In accordance with an embodiment, application server (for example, WebLogic Server, WLS) components and users can be exposed to the inferred application version and real source path because the cloned AppDeploymentMBean will be used for all deployment processing. For example, an ApplicationLifecycleListener in a user application can expose "landscapedesign#V2.0.4.15" as application ID instead of "landscapedesign#V2.0" in config.xml.

Managed Server Scenarios

In accordance with an embodiment, various server states can be presented during the course of MSI-D, and addressed as described in Table 3.

TABLE 3

| | Subsequent State | | | | | |
|---|---|---|---|---|---|---|
| Initial State | Alive | Down | Crashed | Deaf | Mute | Deaf & Mute |
| Alive | Based on notification uptakes new version and retires old version. | Uptakes new version on server start, old version never started. | | Based on notification uptakes new version and retires old version. | | |
| Down Crashed | Uptakes new version on server start, old version never started. | As above. | | As above. | | |
| Deaf Mute Deaf and mute | Based on notification uptakes new version and retires old version. | As above. | | As above. | | |

Application State Check Using AppRuntimeStateRuntimeMBean

In accordance with an embodiment, an API getCurrentStateOnDemand in AppRuntimeStateRuntimeMBean can be used to check state of application on various target servers.

```
/**
 * This API will query Application States for an MSI-D style app from
specified Target on-demand.
 * @param Inferred appId Id of the MSI-D style application
 * @param target Name of Target (Cluster or Server)
 * @param timeout amount of time in milliseconds before the command
times out.  A value of 0 will wait indefinitely
 * @return Properties containing a list of Servers and their corresponding
application state, null if target is invalid or all servers are down
 * @since 10.3.6.0
 * @exclude
 */
Properties getCurrentStateOnDemand(String appId, String target, long timeout);
```

In accordance with an embodiment, an API getMultiVersionStateOnDemand in AppRuntimeStateRuntimeMBean can be used to check state of all versions of an application on various target servers.

```
/**
 * For each configured ids provided, identify all inferred ids on each of
 * managed server to which the configured ids are targeted.
 *
 * Admin Server contacts all relevant servers identified by target on
 * demand.  Some of the managed servers might be slow in responding or may
 * not respond at all.  The use of timeout ensures an upper limit on the
 * time Admin Server will wait for response from managed servers.  Though
 * not recommended, a value of 0 timeout may be used to indefinitely wait
 * for response from all managed servers.  Admin Server only contacts the
 * managed server that are known to be running at this time.
 *
 * This result also includes servers that did not respond.  But it does not
 * include servers that were known to be shutdown at the time of request and
 * were never contacted.
 *
 * Here an example of result:
 * ({"landscapedesign#V2.0", "soilmanagement"}, 100L)
 * <multi-version-state
 * xmlns="http://xmlns.oracle.com/weblogic/multi-version-state"
 * version="1.0">
 * <unresponsive>
 * <target>ms5</target>
 * <target>ms10</target>
 * </unresponsive>
 * <configured-id id="landscapedesign#V2.0">
 * <inferred-id id="landscapedesign#V2.0.2">
 * <state value="STATE_ACTIVE">
 * <target>ms1</target>
 * <target>ms2</target>
 * <target>ms3</target>
 * <target>ms4</target>
 * </state>
 * </inferred-id>
 * </configured-id>
 * <configured-id id="soilmanagement">
 * <inferred-id id="soilmanagement#1">
 * <state value="STATE_ACTIVE"/>
 * <target>ms1</target>
 * <target>ms2</target>
 * <target>ms3</target>
 * <target>ms4</target>
 * <target>ms6</target>
 * <target>ms7</target>
 * <target>ms8</target>
 * <target>ms9</target>
 * </state>
 * </inferred-id>
 * </configured-id>
 * </multi-version-state>
 *
 * @param configuredIds A list of application ids or library's deployment
 * ids as configured in config.xml.  This is the list
 * for which state is being requested
 * @param timeout amount of time in milliseconds before the command times
 * out.  Though not recommended, a value of 0 may be used to
 * wait indefinitely
 * @return XML string in generic structured response format that contains
 * current state data about all inferred application ids for the
 * all the given configured application ids.  The response is of the
 * following format:
 * Response = (Configured Id), (Unresponsive)+
```

```
* Configured Id = (Inferred Id)+
* Inferred Id = (State)+
* State = State Value and (target)+
* Unresponsive = (target)+
* Target = Physical target
*/
String getMultiVersionStateOnDemand(String[ ] configuredIds, long timeout);
```

Session Replication and Eventual Consistency

In traditional application deployments to a cluster, an admin server may drive all running cluster members through deployments in lock-step, which ensures uniformity in deployment across cluster members; when production redeployment is used, the new version of the application is available on all running cluster members at the same time.

In accordance with an embodiment, in environments which support managed server independence for deployment, cluster members can operate independently, polling for changes to deployment-config-overrides.xml. For example, when a new deployment-config-overrides.xml is introduced, with a new version of a given application, each cluster member will pick up the new version on their respective next poll.

In such environments, there may be a duration of time between at least one of the cluster members having deployed the new version; and all of the running cluster members having deployed the new version. Although as described above, the MSI-D approach can be used to provide eventual consistency, there may be periods of non-uniform deployment, which in turn may impact features such as, for example, session replication.

In accordance with an embodiment, the time-window of having non-uniform versions can be reduced by, for example, reducing the poll-interval before deployment-config-overrides.xml file is to be updated. The poll-interval can be restored after processing of the new version has begun.

Expectations for MSI-D Deployment Applications

In accordance with an embodiment, there are certain expectations from MSI-D applications for use with MSI-D:

1. Existing deployments: The deployment should already be present in config.xml for the domain, and the <name> for <app-deployment> (or <library>) in deployment-config-overrides-input.xml should match the <name> for <app-deployment> (or <library>) in config.xml.

2. Cluster deployments: MSI-D applications are supported for cluster targets.

3. No stage deployments: Such "nostage" deployments are supported for MSI-D deployments. The expectation is that deployment location is directly accessible from all the cluster members that are targeted.

4. Shared location for deployment-config-overrides.xml: It is expected that the default or configured location for deployment-config-overrides.xml is on a shared file system so that all cluster members and the admin server can access it from the same location. The default location is "config/" directory in domain. So if the location is not configured, the domain directory should be shared across all cluster members and the admin server.

5. Server restart after placing deployment-config-overrides.xml for the first time: Cluster members or the admin server check for the presence of deployment-config-overrides.xml at server startup. If present, they poll for changes in the future, but if absent they never look for it in their respective lifetimes. So, when a deployment-config-overrides.xml is created/added for the first time, all relevant cluster members and the admin server must be restarted for it to be effective.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing managed server independence for deployment of software applications and libraries, comprising:
  a computer that includes one or more processors and memory, and provides a cloud computing, application server, or other environment that supports the use of a plurality of managed servers, to which at least one or more software applications or libraries are deployable;
  wherein each managed server of the plurality of managed servers is associated with a domain configuration file that specifies the software applications and libraries that are deployed to that managed server;
  wherein a deployment configuration overrides data provides information for the at least one or more software applications or libraries deployable as multiple versions to the managed servers, including, for a software application or library deployable as multiple versions, an indication of:

a particular version of the software application or library,
a source path for the particular version of the software application or library, and
a retire timeout value indicative of a timeout period after which a deployment of the software application will be retired; and
wherein each managed server of the plurality of managed servers independently polls a file system providing the deployment configuration overrides data for changes to deployed software applications or libraries as indicated by the domain configuration file at the managed server and a reference to the deployed software applications or libraries in the deployment configuration overrides data, to update the deployed software applications or libraries at the managed server, and, responsive to such changes, uses the information provided by the deployment configuration overrides data to:
access the source path indicated therein to retrieve an updated particular version of the software application or library, and
deploy the updated particular version of the software application or library to the managed server, from the source path indicated for that particular version,
wherein a deployed version of the software application is associated with a retire timeout value, the deployed version of the software application is retired upon completion of the timeout period.

2. The system of claim 1, wherein a deployment configuration tool receives an input which specifies a deployment configuration for the particular version of the software application or library, and generates as an output the one or more deployment configuration overrides data.

3. The system of claim 1, wherein each of the software applications or libraries to be deployed to the managed servers are provided as a multi-version format application or library.

4. The system of claim 1, wherein each managed server accesses a file system that is one of associated with a particular managed server, or associated and shared between two or more managed servers, and which provides access to the deployment configuration overrides data.

5. The system of claim 1, wherein independent polling and use of the deployment configuration overrides data by the plurality of managed servers provides eventual consistency of deployed application and library versions within the plurality of managed servers.

6. The system of claim 1, wherein each managed server accesses a shared file system and a stored configuration file which specifies the one or more deployment configuration overrides data.

7. The system of claim 1, wherein the system includes a cluster of managed servers that provide the software applications or libraries.

8. The system of claim 1, wherein each software application or library specified in the domain configuration file for a particular managed server is associated with a domain runtime tree,
wherein the domain runtime tree includes additional entries for each of the multiple versions of the software applications or libraries, including for each particular version a source path for that particular version.

9. The system of claim 1, wherein for a particular application deployment the configuration overrides data includes a retire timeout value indicative of a timeout period after which a previous deployment of the application will be retired; and wherein each managed server of the plurality of managed servers operates independently, as determined by the retire timeout value, to direct retirement of older versions of the particular application at that managed server.

10. A method for providing managed server independence for deployment of software applications and libraries, comprising:
providing, at a computer, an environment that supports the use of a plurality of managed servers, to which at least one or more software applications or libraries are deployable;
wherein each managed server of the plurality of managed servers is associated with a domain configuration file that specifies the software applications and libraries that are deployed to that managed server;
accessing a deployment configuration overrides data that provides information for the at least one or more software applications or libraries deployable as multiple versions to the managed servers, including, for a software application or library deployable as multiple versions, an indication of:
a particular version of the software application or library,
a source path for the particular version of the software application or library, and
a retire timeout value indicative of a timeout period after which a deployment of the software application will be retired; and
at each managed server of the plurality of managed servers, independently polling a file system providing the deployment configuration overrides data for changes to deployed software applications or libraries as indicated by the domain configuration file at the managed server and a reference to the deployed software applications or libraries in the deployment configuration overrides data, to update the deployed software applications or libraries at the managed server, and, responsive to such changes, using the information provided by the deployment configuration overrides data to:
access the source path indicated therein to retrieve an updated particular version of the software application or library, and
deploy the updated particular version of the software application or library to the managed server, from the source path indicated for that particular version,
wherein a deployed version of the software application is associated with a retire timeout value, the deployed version of the software application is retired upon completion of the timeout period.

11. The method of claim 10, wherein a deployment configuration tool receives an input which specifies a deployment configuration for the particular version of the software application or library, and generates as an output the one or more deployment configuration overrides data.

12. The method of claim 10, wherein each of the software applications or libraries to be deployed to the managed servers are provided as a multi-version format application or library.

13. The method of claim 10, wherein each managed server accesses a file system that is one of associated with a particular managed server, or associated and shared between two or more managed servers, and which provides access to the deployment configuration overrides data.

14. The method of claim 10, wherein independent polling and use of the deployment configuration overrides data by the plurality of managed servers provides eventual consistency of deployed application and library versions within the plurality of managed servers.

15. The method of claim 10, wherein each managed server accesses a shared file system and a stored configuration file which specifies the one or more deployment configuration overrides data.

16. The method of claim 10, wherein the method is performed within a cluster of managed servers that provide the software applications or libraries.

17. A non-transitory computer readable storage medium, including instructions stored thereon which when read and executed by one or more computers cause the one or more computers to perform the method comprising:
   providing an environment that supports the use of a plurality of managed servers, to which at least one or more software applications or libraries are deployable;
   wherein each managed server of the plurality of managed servers is associated with a domain configuration file that specifies the software applications and libraries that are deployed to that managed server;
   accessing a deployment configuration overrides data that provides information for the at least one or more software applications or libraries deployable as multiple versions to the managed servers, including, for a software application or library deployable as multiple versions, an indication of:
      a particular version of the software application or library,
      a source path for the particular version of the software application or library, and
      a retire timeout value indicative of a timeout period after which a deployment of the software application will be retired; and
   at each managed server of the plurality of managed servers, independently polling a file system providing the deployment configuration overrides data for changes to deployed software applications or libraries as indicated by the domain configuration file at the managed server and a reference to the deployed software applications or libraries in the deployment configuration overrides data, to update the deployed software applications or libraries at the managed server, and, responsive to such changes, using the information provided by the deployment configuration overrides data to:
      access the source path indicated therein to retrieve an updated particular version of the software application or library, and
      deploy the updated particular version of the software application or library to the managed server, from the source path indicated for that particular version, and
      wherein a deployed version of the software application is associated with a retire timeout value, the deployed version of the software application is retired upon completion of the timeout period.

18. The non-transitory computer readable storage medium of claim 17, wherein each of the software applications or libraries to be deployed to the managed servers are provided as a multi-version format application or library.

19. The non-transitory computer readable storage medium of claim 17, wherein each managed server accesses a file system that is one of associated with a particular managed server, or associated and shared between two or more managed servers, and which provides access to the deployment configuration overrides data.

20. The non-transitory computer readable storage medium of claim 17, wherein independent polling and use of the deployment configuration overrides data by the plurality of managed servers provides eventual consistency of deployed application and library versions within the plurality of managed servers.

* * * * *